United States Patent [19]
Maus et al.

[11] Patent Number: 5,339,628
[45] Date of Patent: Aug. 23, 1994

[54] METHOD FOR MONITORING THE CATALYTIC ACTIVITY OF A CATALYTIC CONVERTER IN THE EXHAUST GAS SYSTEM OF AN INTERNAL COMBUSTION ENGINE

[75] Inventors: Wolfgang Maus; Helmut Swars; Rolf Brück, all of Bergisch Gladbach, Fed. Rep. of Germany

[73] Assignee: Emitec Gesellschaft fuer Emissionstechnologie mbH, Duesseldorf, Fed. Rep. of Germany

[21] Appl. No.: 24,656

[22] Filed: Mar. 1, 1993

[30] Foreign Application Priority Data

Aug. 28, 1990 [DE] Fed. Rep. of Germany ....... 4027207

[51] Int. Cl.⁵ ............................................. F01N 3/20
[52] U.S. Cl. ........................................ 60/277; 60/274
[58] Field of Search ............................. 60/274, 277

[56] References Cited

U.S. PATENT DOCUMENTS

| | | | |
|---|---|---|---|
| 3,766,536 | 10/1973 | Hile | 60/277 |
| 4,122,720 | 10/1978 | Podl | 60/277 |
| 4,617,794 | 10/1986 | Fufitani et al. | 60/274 |

FOREIGN PATENT DOCUMENTS

| | | |
|---|---|---|
| 0236659 | 9/1987 | European Pat. Off. . |
| 0245737 | 11/1987 | European Pat. Off. . |
| 0245738 | 8/1989 | European Pat. Off. . |
| 0223058 | 10/1989 | European Pat. Off. . |
| 2406073 | 10/1975 | Fed. Rep. of Germany . |
| 2444334 | 3/1976 | Fed. Rep. of Germany . |
| 2346425 | 2/1978 | Fed. Rep. of Germany . |
| 2643739 | 3/1978 | Fed. Rep. of Germany . |
| 3516981 | 11/1986 | Fed. Rep. of Germany . |
| 3710268 | 10/1988 | Fed. Rep. of Germany . |
| 3811732 | 10/1989 | Fed. Rep. of Germany . |
| 3841685 | 6/1990 | Fed. Rep. of Germany . |
| 53-89482 | 7/1978 | Japan . |
| 55-110941 | 8/1980 | Japan . |

*Primary Examiner*—Raymond A. Nelli
*Assistant Examiner*—Weilun Lo
*Attorney, Agent, or Firm*—Herbert L. Lerner; Laurence A. Greenberg

[57] ABSTRACT

A method for monitoring catalytic activity of a catalytic converter through which exhaust gas can flow in an exhaust system of an internal combustion engine includes measuring a temperature at least at two temperature measuring sensors and periodically repeatedly determining a temperature measuring variable from signals issued by the sensors during operation of the engine with an engine monitoring system. According to one method, the sensors are spaced apart in flow direction in or near the catalytic converter, the temperature measuring variable is averaged over a sufficiently long period of engine operation to average out special strains and form a mean temperature value, catalytic activity is ascertained by comparing the mean temperature value with a predetermined limit value, and a report is issued if the mean temperature value does not correspond to the limit value. According to another method, the sensors are associated with the catalytic converter, further measuring variables characterizing an applicable operating state of the engine are determined, a temperature limit value is determined from the further measuring variables, catalytic activity is determined by comparing the temperature measuring variable with the temperature limit value, and a report is issued if the temperature measuring variable is lower than the temperature limit value.

16 Claims, 3 Drawing Sheets

METHOD FOR MONITORING THE CATALYTIC ACTIVITY OF A CATALYTIC CONVERTER IN THE EXHAUST GAS SYSTEM OF AN INTERNAL COMBUSTION ENGINE

CROSS-REFERENCE TO RELATED APPLICATION:

This application is a Continuation of International Application Serial No. PCT/EP91/01582, filed Aug. 20, 1991.

The invention relates to methods for monitoring the catalytic activity of a catalytic converter in the exhaust system of an internal combustion engine, and to configurations having a catalytic converter for use in the exhaust gas system of an internal combustion engine that are especially suitable for monitoring by the method of the invention.

In order to meet the increasingly stringent environmental protection regulations in many countries, internal combustion engines, especially motor vehicle engines, are increasingly being equipped with exhaust systems that are provided with catalytic converters for converting pollutants in the exhaust gases of the engines into harmless substances. The term catalytic converter is typically understood to mean a honeycomb-like body of metal or ceramic that has a number of channels through which exhaust gases can flow. Each channel has a wall that is covered with a coating of catalytically active material, which is the catalyst itself. Metal catalytic converters are generally made up of structured sheet metal plates that are stacked, spirally wound, or otherwise intertwined. Such forms are described in Published European Application No. 0 223 058 B2, corresponding to U.S. Pat. No. 4,824,011; Published European Application No. 0 245 737 B2, corresponding to U.S. Pat. Nos. 4,832,998 and 4,923,109; or Published European Application No. 0 245 738 B2, corresponding to U.S. Pat. Nos. 4,803,189 and 4,946,822, for instance.

In order to assure the function of a catalytic converter in the exhaust system of an internal combustion engine, it is known to provide the catalytic converter with measuring sensors for monitoring the temperature, or the like, so that conclusions can be drawn from the measured values obtained as to its function during engine operation. Proposals along those lines can be found in German Published, Non-Prosecuted Application DE 26 43 739 A1, German Published, Non-Prosecuted Application DE 37 10 268 A1, and Published European Application No. 0 236 659 A1. The first two of those references propose equipping a catalytic converter with at least two temperature sensors, which are disposed at different locations in the catalytic converter, one after the other in terms of the direction of the flowing exhaust gas. The measuring sensors may both be disposed outside the catalytic converter, with a first sensor upstream of the inlet end of the catalytic converter and a second sensor downstream of the outlet end of the catalytic converter. German Published, Non-Prosecuted Application DE 26 43 739 A1 also provides for at least one measuring sensor in the interior of the catalytic converter. Those two references also propose forming a signal from the sensor measurement signals that corresponds to the difference in the temperatures ascertained by the measurement sensors, and using that signal to evaluate the function of the catalytic converter. In Published European Application No. 0 236 659 A1, an evaluation system for the signals of the measurement sensors is presented. The evaluation system issues a warning signal if the temperature difference exceeds a certain first limit value, and a signal warning of permanent damage if the temperature difference exceeds a second limit value, which is located markedly above the first limit value.

German Published, Non-Prosecuted Application DE 26 43 739 A1 also proposes placing two temperature measuring sensors right next to one another in the region of the outlet end of the catalytic converter. A first sensor has a catalytically active surface, but a second sensor has a catalytically inactive surface. With that kind of measurement configuration, it is possible to ascertain whether or not the exhaust gas flowing past the measuring sensors still contains any convertible pollutants. If so, that would cause the two measuring sensors to signal different temperatures.

The prior art offers no teaching whatever toward achieving long-term reliable monitoring of a catalytic converter in an exhaust system. Over the long term, in other words over an average mileage on the order of 100,000 km or an average time in operation of on the order of 1000 hours in the case of a motor vehicle engine, the capacity of a catalytic converter to convert the pollutants delivered to it decreases steadily. That process is called "aging" and it is caused by manifold physical and chemical environmental factors, which are unavoidable no matter how carefully the catalytic converter is handled. In a catalytic converter, not only aging but also "poisoning" is well known to be possible (if leaded gasoline is used in a gasoline engine provided with the catalytic converter, for instance) and can very quickly lead to the partial or complete loss of catalytic activity. The process of aging depends to a great extent on the strain to which the catalytic converter is exposed in its typical operation. That means that in virtually any motor vehicle, usage-specific aging of the catalytic converter occurs. Generally valid predictions regarding the durability of a catalytic converter, even if they are differentiated for the various automobile types, are virtually impossible to make. General guidelines on the length of time in use or the mileage after which a catalytic converter would have to be replaced, would have to be especially stringent in order to prevent inactive catalytic converters from continuing to be used. However, some catalytic converters that are still significantly usable would then unavoidably be replaced, and moreover there would be no means to detect poisoned catalytic converters. A remedy can only be created in such a case by providing monitoring of the functional capability of each catalytic converter that is carried out over the long term and is reliable. The monitoring must be performed in accordance with criteria that are maximally independent of the strain or load on a particular catalytic converter. As is also apparent from the references mentioned above, the variability of the aforementioned temperature measuring variables in the exhaust gas system of a motor vehicle is quite high during regular operation of the catalytic converter. The highest incident value under some circumstances may be more than twice as high as the lowest incident value. Accordingly, in order to evaluate the activity of a catalytic converter, it cannot be sufficient to merely indicate a single, load-independent lower limit value for the significant temperature measuring variable, wherein the catalytic converter is assumed to be defective if the temperature measuring variable is found not to be above that value.

It is accordingly an object of the invention to provide a method for monitoring the catalytic activity of a catalytic converter in the exhaust gas system of an internal combustion engine, which overcomes the hereinafore-mentioned disadvantages of the heretofore-known methods of this general type and which permit reliable evaluation of the signals of temperature sensors assigned to the catalytic converter, in such a way that reliable findings regarding the catalytic activity of the catalytic converter are obtained.

With the foregoing and other objects in view there is provided, in accordance with the invention, a method for monitoring catalytic activity of a catalytic converter through which exhaust gas can flow in an exhaust system of an internal combustion engine, which comprises measuring a temperature at least at two temperature measuring sensors being spaced apart in flow direction in or near the catalytic converter; periodically repeatedly determining a temperature measuring variable from signals issued by the sensors during operation of the engine with an engine monitoring system; averaging the temperature measuring variable over a sufficiently long period of engine operation to average out special strains and form a mean temperature value; ascertaining catalytic activity by comparing the mean temperature value with a predetermined limit value; and issuing a report if the mean temperature value does not correspond to the limit value.

According to a first variant of the invention, a temperature measurement variable is formed from the signals of the temperature sensors assigned to the catalytic converter, that is observed over a long period of time, forming a mean temperature value. The following advantages are attained as a result:

a) Transient operating states, which are usually called "load changes", then have practically no effect on the measurement result, because their duration is very short in comparison with the measurement duration. This substantially simplifies interpreting the measurement findings. The processes in a catalytic converter during a load change are very complex and are accompanied by measurement results that under some circumstances deviate sharply from measurement results in steady-state operation. This can be ascribed above all to the fact that upon a load change, although the velocity of the exhaust gas flowing through the catalytic converter is changed within fractions of a second, nevertheless the temperature distribution within the catalytic converter does not follow suit until after a period of several seconds. Through the use of a measurement that extends over a long period of time, the influence of transient effects can be substantially suppressed.

b) The mean temperature value includes a number of different operating states of the engine. It therefore permits a statement that is largely independent of the particular use of the engine.

In accordance with another mode of the invention, there is provided a method which comprises dimensioning the long-term period of time, which is necessarily interrupted whenever the engine is temporarily turned off, for at least approximately 10 hours, and preferably for a duration between approximately 100 and approximately 1000 hours. A compromise between the desire to attain a statement that is as independent as possible regarding the special strain or load on the engine and the capability of the earliest possible recognition of any damage that may be occurring, must be found. With a view to employing the invention in a motor vehicle, this dimensioning of the time period is equivalent to vehicle mileage of approximately 1000 km. Its upper limit depends on current trial and error values for the durability of a catalytic converter, which at present is expected to be a mileage of about 100,000 km.

In accordance with a further mode of the invention, there is provided a method which comprises determining the temperature measurement variable periodically and recording it in a multichannel analyzer. In a multichannel analyzer, the input measurement variable is first put into digital form by means of a digital/analog converter (if this has not already been done), and then is used as an address for identifying a memory location in a memory of the multichannel analyzer. A number present at the thus-addressed memory location incremented by 1. The multichannel analyzer enables a statistical statement to be made as to how often a temperature measurement variable of a predetermined height has been measured during the measurement period. Correspondingly, a statement regarding the type of use of the engine can also be made, which makes it possible to provide further improvement in catalytic converter monitoring. It is especially advantageous in this respect for the specification of the limit value for determining whether or not the catalytic activity of the catalytic converter is still adequate to be adapted to the type of use, to be ascertained with the multichannel analyzer. In addition to the mean temperature value which can be ascertained from the distribution, the form of distribution can also be used to evaluate the catalytic activity.

In accordance with an added mode of the invention, there is provided a method which comprises integrating the temperature measurement variable over the long period of time to form the mean temperature value. The method according to the invention can be attained especially simply if this is done. This can be performed with a simple analog integrator (a low-pass filter, for instance). This makes the equipment for carrying out the method especially simple.

In accordance with an additional mode of the invention, there is provided a method which comprises observing other measurement variables that characterize the operating state of the engine itself, along with the temperature measurement variable, while the measurement is being carried out. Naturally, this also involves a statement as to the current strain or load on the catalytic converter. Further measurement variables of this kind include the engine rpm, exhaust temperature, exhaust pressure, throughput in the exhaust system, or throughput in the system for delivering air to the engine, for instance. Such measurement variables are already determined by the electronic engine control systems that have meanwhile gained widespread use for the sake of fuel metering in engine operation, and so forth. This suggests employing them for evaluating the measurement values that are determined at the catalytic converter. Since the measurement values determined at the catalytic converter are highly dependent on the current operating state, the determination of the activity can be made largely independent of the type of strain or stress on the engine by adapting the limit value to the further measurement variables, specifically to their mean values.

In accordance with yet another mode of the invention, there is provided a method which comprises performing the recording of the further measurement variables by means of an optionally multidimensional multichannel analyzer, as was already discussed for the temperature measurement variable. In this way, the engine operating state, namely, a "mean value" for the operating state, can be determined jointly, by taking the mutual correlation of the further measurement values into account. It is naturally especially advantageous to record both the temperature measurement variable and the further measurement variables together in a corresponding multichannel analyzer. This means that after each measurement has been completed, statistical statements as to the frequency of arbitrary, uniquely characterized operating states can be made. In particular, measurement values that clearly represent transient states and thus do not provide a useful statement can be precluded from further analysis.

With the objects of the invention in view, there is also provided a method for monitoring catalytic activity of a catalytic converter through which exhaust gas can flow in an exhaust system of an internal combustion engine, which comprises measuring a temperature at least at two temperature measuring sensors being associated with the catalytic converter; periodically repeatedly determining a temperature measuring variable from signals issued by the sensors during operation of the engine with an engine monitoring system; determining further measuring variables characterizing an applicable operating state of the engine; determining a temperature limit value from the further measuring variables; determining catalytic activity by comparing the temperature measuring variable with the temperature limit value; and issuing a report if the temperature measuring variable is lower than the temperature limit value.

Within the scope of the first mode of attaining the object of the invention as given above, in the context of all of the embodiments, markedly long-term measurements are performed, for the basic purpose of statistical averaging over all of the operating states of the engine and of the catalytic converter that occur in the course of one measurement. In this way, measurement variables that are largely independent of special operating states are obtained which therefore permit a general statement, with adequate certainty, as to whether or not the activity of the catalytic converter can still be considered adequate. In the context of the second mode of attaining the object of the invention, in the context of short-term measurements (where the expenditure of time for one measurement is on the order of magnitude of a few seconds), the intent is to evaluate the temperature measurement variables picked up at the catalytic converter, by taking further measurement data into account, from which the operating state of the engine and of the catalytic converter can be derived, and to obtain a statement from them regarding the activity of the catalytic converter that is independent of the special operating state during which the measurement took place. Moreover, the first method according to the invention can advantageously be combined with the second method according to the invention, for instance in such a way that the long-term development of the statements obtained in the context of the second method according to the invention is observed.

It is also possible to select a special operating state, or more than one special operating state, on the basis of predetermined values for the further measurement variables and then to determine the activity of the catalytic converter only for such special operating states. Possible examples of such special operating states are those that occur with sufficient probability in any engine to be monitored. In the case of a motor vehicle, examples are idling, traveling over a country road, slow acceleration, and so forth. Advantageously, a mean value can be formed to determine the activity over a plurality of such operating states.

In accordance with another mode of the invention, in the context of the second method according to the invention, there is provided a method which comprises determining the temperature limit value to take at least one temperature measurement variable ascertained in the context of an earlier measurement into account in each measurement, in addition to the further measurement variables that are present. The overall result is that for determining the temperature limit value, the possibility is afforded of taking the middle-term or long-term course of the temperature measurement value over time into account and thus to adapt the particular temperature limit value in an individual case to the catalytic converter and to the circumstances of its strain.

In accordance with a further mode of the invention, there is provided a method which comprises recording the activity of the catalytic converter determined in the context of the method of the invention over a long-term period of time and taking the thus-available information into account for determining the temperature limit value at a given time. This is especially advantageous whenever it is not the entire catalytic converter that is observed in the context of the monitoring method but rather only a segment of it. If the catalytic converter is new, then the observed activity of a segment, for instance in the outlet region of the catalytic converter, is low, because the conversion takes place virtually completely in the regions of the catalytic converter in the vicinity of the inlet end, which the exhaust gas reaches first as it flows through the exhaust system. With the loss in activity of the initially active regions of the catalytic converter, the activity of the monitored segment rises. It reaches a maximum after a certain period of time and then decreases again as a consequence of aging. The long-term monitoring of the activity of the segment permits a very sensitive adaptation of the temperature limit value. It is possible for no monitoring to occur immediately after the catalytic converter has been put into service, and then after a certain period of time, once the activity has passed a certain threshold, the temperature limit value can be selected very broadly to recognize any possible "poisoning phenomena". Finally, with the onset of a decrease in activity, very sensitive adjustment of the temperature limit value is possible.

It has already been explained that evaluating a measurement performed in a transient operating state is difficult. It is accordingly especially advantageous to monitor the measurement signals of the temperature measuring sensors and/or of the further measuring sensors for such transients, having a certain identifier that is a signal which varies significantly over time. In accordance with an added mode of the invention, there is provided a method which comprises suspending the measurement if the deviation over time of at least one signal differs substantially from 0. In any case, this assures that only measurements in a substantially steady state are taken into account in monitoring the catalytic converter.

Surprisingly, it is not impossible to evaluate the measurement variables that can be ascertained in the context of certain selected transients. In particular, in accordance with an additional mode of the second method according to the invention, there is provided a method which comprises monitoring the signal of a first temperature measuring sensor for discontinuous changes; observing the signal of the second temperature measuring sensor over a short period of time, if a discontinuous change occurs; and forming the temperature measuring variable from the changes over time of the signal of the second temperature measuring sensor.

In accordance with a concomitant mode of the invention, there is provided a method which comprises selecting a length of the short period of time of at most approximately 3 seconds, and preferably between approximately 1 second and approximately 2 seconds.

The correspondingly "discontinuous" transients that are allowable are those that take the engine from a first steady operating state to a second steady operating state within a brief time. The fact that this is the case must sometimes be ascertained by suitably evaluating the further measurement variables. In the present case a first temperature measuring sensor is preferably a measuring sensors that is located upstream of the inlet end of the catalytic converter and has low thermal inertia, so that discontinuous changes in the exhaust gas temperature can be rapidly recognized by it. The second temperature measuring sensor is disposed in the interior of the catalytic converter or downstream of the outlet end of the catalytic converter. The change in the signal of the temperature measuring sensor over time, which represents the change in the thermal and catalytic conditions in the converter, is to be evaluated then. Within the context of monitoring by evaluating simple transient states, it must also be assured that no further transient that would make the measurement findings wrong will occur during the measurement.

Other features which are considered as characteristic for the invention are set forth in the appended claims.

Although the invention is illustrated and described herein as embodied in a method for monitoring the catalytic activity of a catalytic converter in the exhaust gas system of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
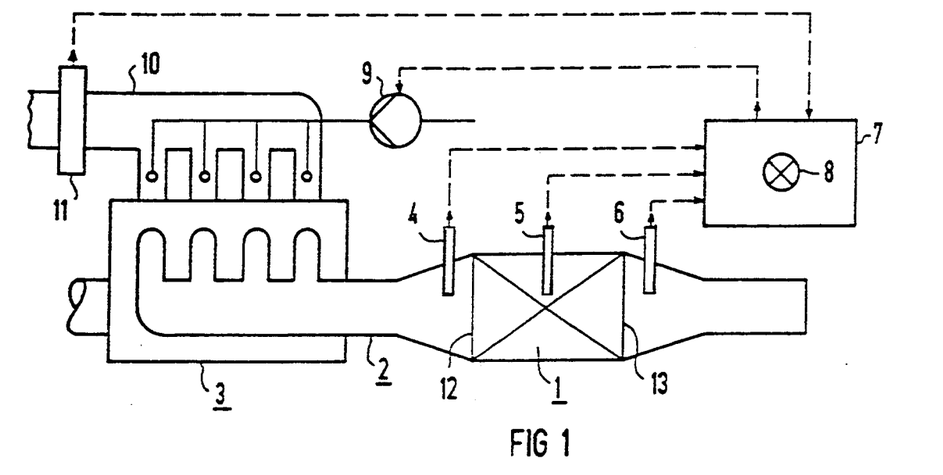
FIG. 1 is a fragmentary, diagrammatic, plan view of a configuration with an internal combustion engine, exhaust system and catalytic converter, that is disposed for employing the method of the invention.

Referring now in detail to the figures of the drawing, in which components that function the same are each provided with the same reference numeral in order to simplify the description, and first, particularly, to FIG. 1 thereof, there is seen a diagrammatic illustration of an internal combustion engine 3 with an exhaust system 2 in which a catalytic converter 1 is located. The catalytic converter 1 is provided with temperature measuring sensors 4, 5 and 6 which, by way of example, may be thermocouples or temperature-variable electrical resistors. The temperature measuring sensors 4, 5, 6 are connected to an engine monitoring system 7, for example a suitably expanded electronic engine control unit, which receives all of the measuring data necessary for operating the engine 3 and processes them further. The method of the invention is for monitoring the catalytic activity of the catalytic converter 1 through which exhaust gas flows. The apparatus in which the method is performed during operation of the engine 3 is located in the engine monitoring system 7. A report that the engine monitoring system 7 is intended to issue, if insufficient activity in the catalytic converter 1 is detected, as a rule includes the activation of an indicator 8, such as a control light. Naturally, it is also possible for the report to be further processed in some other way, and in an extreme case, for instance, it is possible for further operation of the engine 3 to be prevented entirely. In order to control the operation of the engine 3, the engine monitoring system 7 receives the necessary data from appropriate transducers in the engine 3. By way of example, FIG. 1 shows a fresh gas system 10 for delivering uncombusted air to the engine 3, which is provided with an air flow rate meter 11, that determines the flow rate of the air flowing to the engine 3 and informs the engine monitoring system 7 of it. For the sake of simplicity, no other measurement pickups are shown. In particular, as a rule there are devices present for measuring the operating frequency (or the rpm) of the engine 3, and so forth. The control functions of the engine monitoring system 7 include fuel metering, for instance. Accordingly, a fuel pump 9 can be influenced by the engine monitoring system 7. For the sake of simplicity, an ignition system for the engine 3 is not shown. The necessity for the ignition system is self-evident and therefore no further cogent on it is needed. In FIG. 1, the catalytic converter 1 is provided with a first measuring sensor 4, which is disposed upstream of an inlet end 12, at which the exhaust gases leaving the engine 3 flow into the catalytic converter 1. A second temperature measuring sensor 5 is located in the interior of the catalytic converter 1, and in the present example it is in the middle. A third temperature measuring sensor 6 is located downstream of an outlet end 13, through which the exhaust gases leave the catalytic converter 1 again. Without substantially impairing the function of the first temperature measuring sensor 4 and the third temperature measuring sensor 6, these sensors may also be disposed in the interior of the catalytic converter 1, respectively in the vicinity of the inlet end 12 and the outlet end 13. Multiple monitoring of the catalytic converter 1 is possible with the three measuring sensors 4, 5, 6 that are shown. By taking the signals of the first temperature measuring sensor 4 and the second temperature measuring sensor 5 into account, the activity of the catalytic converter 1 can be monitored from the inlet end 12 as far as the middle of the catalytic converter 1. If the catalytic converter 1 is new, then the activity is high, while with increasing aging of the catalytic converter 1, the activity decreases. The activity of the region from the middle of the catalytic converter 1 as far as the outlet end 13 can be monitored with the second temperature measuring sensor 5 and the third temperature measuring sensor 6. For a new catalytic converter 1, it is initially low, then it rises in the course of use with the failure of the initially active segment of the catalytic converter, and then it drops again as aging phenomena ensue. The term "activity" is understood herein not as a theoretical catalytic capacity of the catalytic converter 1, but instead it means the rate of conversion of the pollutants in the exhaust gas into harmless substances, that is attained in actual operation. The theoretical conversion capability of a catalytic converter is naturally subject to a steady decrease due to aging, from the moment it is first put into service. However, as long as it is above a critical value, the activity to be measured by the monitoring system of the invention would be constant. It is not until the decrease in activity becomes measurable that the activity directly corresponds to the maximum conversion capability of the catalytic converter 1. Naturally, with a configuration of measuring sensors 4, 5, 6 as is shown in FIG. 1, it is possible to achieve the monitoring with all three possible pairs of measuring sensors 4, 5, 6. Over the long term, that is a period of use ranging from several hundred to several thousand hours, a different course of the activity will be measured in each case. However, in any case, a decreasing activity arises over the long term, which must be monitored upon attaining a limit value that is to be selected in accordance with the configuration provided. Once this limit value is attained, the planned report must be issued. The measuring configurations shown as possible examples in FIG. 1 permit any arbitrary embodiment of the monitoring according to the invention. For the case of long-term measurements, this is readily apparent. If short-term measurements are to be made, then a configuration using the first thermocouple 4 and the third thermocouple 6 might possibly be disadvantageous. In that case, a measuring configuration with the first temperature measuring sensor 4 and the second temperature measuring sensor 5 is most advantageous. This is because it is the first temperature measuring sensor 4 that is most likely to be in a position to detect an abrupt temperature change in the exhaust gas flowing to the catalytic converter 1. Accordingly, its structure can be provided for the lowest possible thermal inertia. For short-term measurement and in particular for short-term measurement with the evaluation of transients, the second temperature measuring sensor 5 should be positioned not overly far away from the first temperature measuring sensor 4. As already discussed, changes in the flow velocity of the exhaust gas time are transported through the catalytic converter 1 in the briefest possible time (at the speed of sound), while temperature changes are transported slowly, within a period of several seconds. The signal of the second temperature measuring sensor 5 therefore not only varies substantially more slowly than the signal of the first temperature measuring sensor 4, but a delay on the order of magnitude of several seconds is also present between any changes that occur. This delay must be taken into account in the engine monitoring system 7 if applicable and also corrected as needed.

Figure 2:
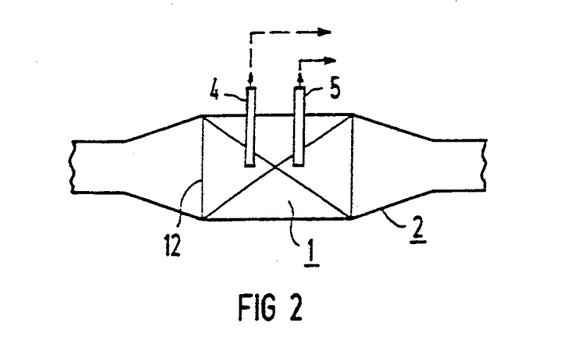
FIGS. 2 and 3 are fragmentary plan views and FIGS. 4 and 5 are perspective views of examples of a way in which a catalytic converter that is monitorable according to the invention can be achieved with temperature measuring sensors.

FIG. 2 shows a further embodiment possibility for assigning a first temperature measuring sensor 4 and a second temperature measuring sensor 5 to a catalytic converter 1 located in an exhaust system 2. In the example shown, both measuring sensors 4, 5 are disposed in the interior of the catalytic converter 1. With this configuration, both long-term and short-term measurements can be performed. However, because of the thermal inertia that necessarily exists in the region between the inlet end 12 and the first temperature measuring sensor 4, a measuring method in which transient operating states are evaluated is not that advantageous. In order to correct the influence of any transient operating states that may be present, the signals of the measuring sensors 4, 5 are advantageously integrated with a time constant on the order of magnitude of several seconds. This can either be per-formed electronically (with the use of low-pass filters), or else the temperature measuring sensors 4, 5 having a correspondingly high thermal inertia can advantageously be used (thermocouples which are surrounded by suitably solid sleeves, resistor wires that are embedded in the structure of the catalytic converter 1, or the like).

Figure 3:
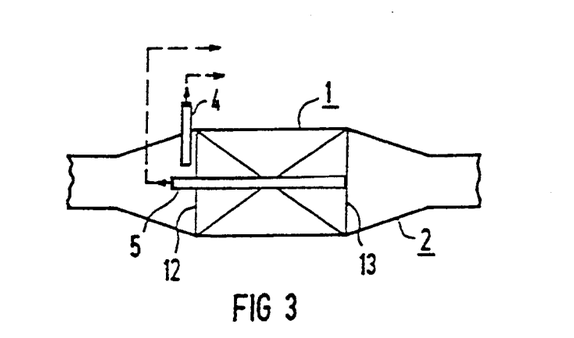

FIG. 3 shows a configuration in which a first temperature measuring sensor 4 is disposed upstream of the inlet end 12 of the catalytic converter 1 in the exhaust system 2 and a second measuring sensor 5 extends through the catalytic converter 1 from the inlet end 12 to the outlet end 13. The structural layout of the temperature measuring sensor and its incorporation into the catalytic converter 1 are not that critical. The second measuring sensor 5 need not necessarily be located in the middle of the catalytic converter 1, nor need it be straight (for example, depending on the construction of the catalytic converter 1, a spiral version would be conceivable). Moreover, as in the case shown, measuring sensors 4, 5 having certain three-dimensional extensions at right angles to the direction of the flowing exhaust gas are entirely advantageous, unless the least possible thermal inertia is crucial (as is needed to achieve the method of the invention where transients are evaluated). In general, the impingement of exhaust gas on a catalytic converter 1 is entirely unhomogeneous at right angles to the direction of flow of the exhaust gas, and by using "extended" measuring sensors 4, 5, findings on conditions that are averaged over certain regions of the catalytic converter 1 are achieved, which are more replicable and better transmissible than findings on conditions that are strictly limited in three-dimensional terms.

The measuring system of FIG. 3 is not very suitable for short-term measurements. It is used for long-term measurements, as will be described below in conjunction with FIG. 6.

Figure 4:
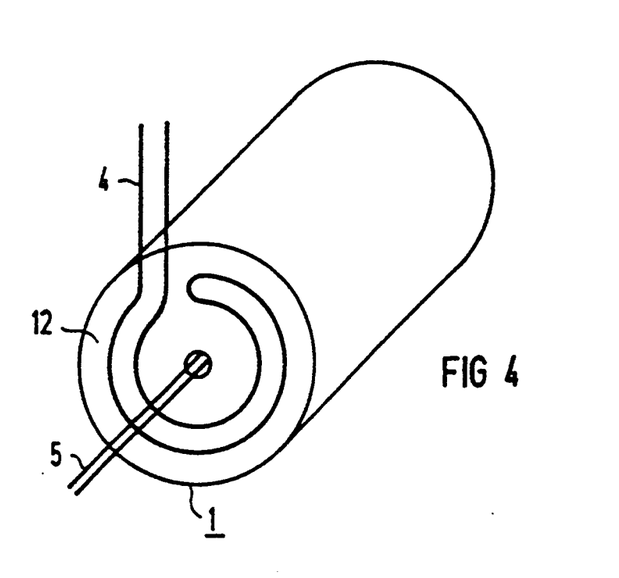

FIG. 4 shows a special embodiment of the configuration shown diagrammatically in FIG. 3. Both temperature measuring sensors 4, 5 are constructed as looplike resistor wires, having an electrical resistance that is temperature-dependent in each case. The first measuring sensor 4 is placed on the inlet end 12 of the catalytic converter 1 and secured to it, or it is mounted in some other way in the immediate vicinity of the inlet end 12. The second measuring sensor 5 extends within the interior of the catalytic converter 1.

Figure 5:
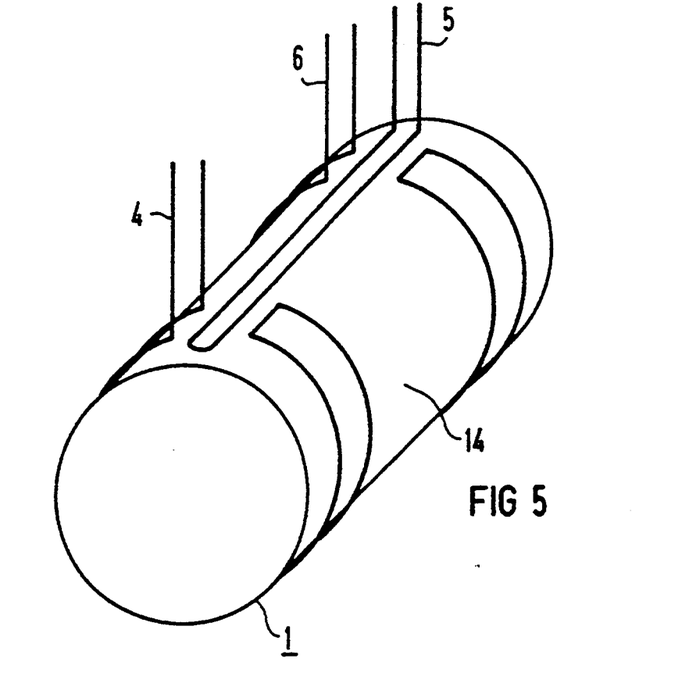

A version of a catalytic converter 1 with temperature measuring sensors 4, 5, 6 that in principle is similar to the configurations of FIGS. 3 and 4 is shown in FIG. 5. However, the second temperature measuring sensor 5 is not located inside the catalytic converter 1 but rather is mounted on a jacket surface 14. The same is true for the first temperature measuring sensor 4 and the third temperature measuring sensor 6. The version of FIG. 5 is especially advantageous because it does not require any alterations in the interior of the catalytic converter 1. It is especially advantageous in a catalytic converter 1 having a metal carrier body, which typically already has a solid jacket tube having an outer surface that forms the jacket surface 14. Resistor wires can easily be secured on such a catalytic converter 1 and can easily be replaced in the event of damage. The first temperature measuring sensor 4 and the third temperature measuring sensor 6 are wound on the jacket surface 14, each in the vicinity of a respective end of the catalytic converter 1. Simple hairpin loops of resistor wires are shown for all three measuring sensors 4, 5, 6. Naturally, the hairpin loops may be replaced with other types of windings, especially if longer wire lengths are necessary, without impairing the function.

Figure 6:
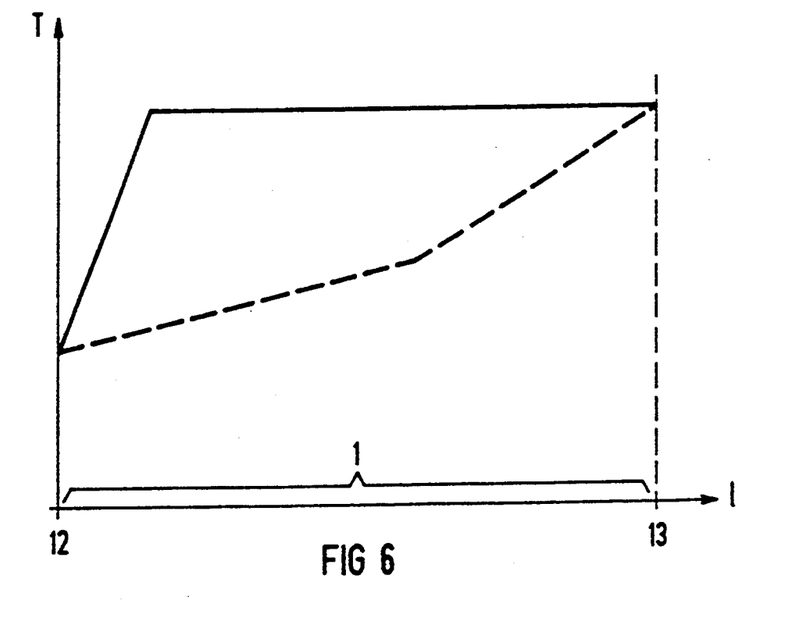
FIG. 6 is a graph of a temperature distribution in the interior of a catalytic converter during operation.

FIG. 6 shows the temperature distribution in the interior of a catalytic converter 1 in steady-state operation. The path extending from the inlet end 12 to the outlet end 13 through the catalytic converter 1 is shown on the abscissa, and the applicable temperature is plotted along the ordinate. The temperature of the exhaust gas flowing into the catalytic converter must have a value that is above the minimum temperature required for operation of the catalytic converter 1. The curve shown in solid lines represents the course of the temperature for a relatively new catalytic converter 1. Immediately downstream of the inlet end 12 (corresponding to the zero point in the diagram), the temperature rises very quickly and soon attains a maximum value, which remains approximately constant as far as the outlet end 13, depending on the thermal conductivity of the catalytic converter 1 and on the thermal transfer mediated by the flowing exhaust gas. The curve shown in dashed lines represents the course of the temperature for a greatly aged catalytic converter 1. The temperature only slowly rises from the inlet end 12. The activity of the regions of the catalytic converter 1 directly downstream of the inlet end 12 has dropped very sharply, although it does not entirely disappear. It is not until regions in the vicinity of the outlet end 13 that a pronounced temperature increase occurs, because there is still activity there. In the context of a configuration of temperature measuring sensors in the form of resistor wires shown in FIG. 3 or FIG. 4, the first thermocouple 4 would measure the temperature of the catalytic converter at the inlet end 12, and the second measuring sensor 5 measures a temperature value that is averaged over the entire length of the catalytic converter 1, corresponding to the integral of the curve shown in FIG. 6. If the catalytic converter 1 is still fully functional, then the first temperature measuring sensor 4 and the second temperature measuring sensor 5 would measure essentially identical temperatures. If the aging of the catalytic converter 1 is advanced, then the first measuring sensor 4 measures a markedly lower temperature than the second measuring sensor 5. The temperature difference that accordingly occurs is a measure of the aging of the catalytic converter 1. It is initially slight, it rises as use in-creases, and finally it drops again, if the catalytic converter 1 has lost activity over its entire length, and in the extreme case, if the catalytic converter 1 has completely lost its activity, there is no longer any temperature difference. The activity of the catalytic converter 1 must be considered insufficient as soon as the temperature difference has attained its maximum, after being corrected for influences resulting from the special operating state of the engine, and the limit value must be selected accordingly.

Figure 7:
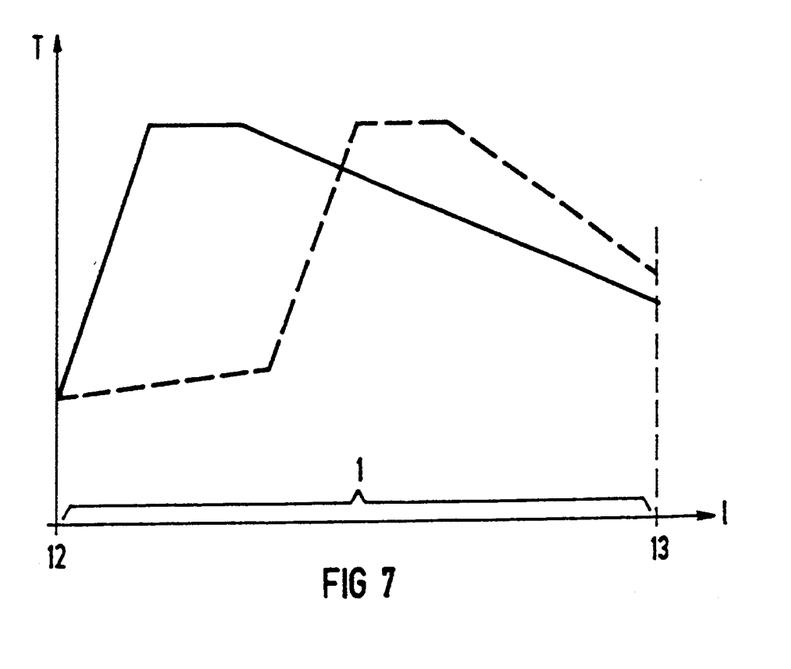
FIG. 7 is a graph of the temperature distribution over a jacket surface of a catalytic converter during operation.

FIG. 7 shows the course of the temperature on the jacket of the catalytic converter 1, with a graph being configured as in FIG. 6. An essential feature is that after reaching its maximum, the temperature does not remain substantially constant. Instead, it decreases again downstream of the zone of the catalytic converter 1 in which the catalytic reaction primarily occurs. This can be ascribed primarily to heat losses from radiation. Downstream of the active zone, no further heat development takes place, and therefore the temperature of the catalytic converter 1 decreases again in the region of the jacket downstream of the most-active zone. Correspondingly, long-term monitoring can also be performed in such a way that the location of the zone of the highest temperature on the jacket is determined. In the context of the invention, this is performed by way of example with a configuration according to FIG. 5. This configuration can be improved as needed, so that a number of temperature measuring points are provided on the jacket of the catalytic converter 1, in order to enable determination of the three-dimensional temperature distribution at any time.

We claim:

1. A method for monitoring catalytic activity of a catalytic converter through which exhaust gas can flow in an exhaust system of an internal combustion engine, which comprises:
   measuring a temperature at least at two temperature measuring sensors of which at least one is disposed in the catalytic converter and which sensors are spaced apart in flow direction;
   periodically repeatedly determining a temperature measuring variable from signals issued by the sensors during operation of the engine with an engine monitoring system;
   averaging the temperature measuring variable over a sufficiently long period of engine operation to form a mean temperature value which is substantially unaffected by short-term load conditions;
   comparing the mean temperature value with a predetermined limit value; and
   indicating if a mean temperature value does not correspond to the limit value and ascertaining a catalytic activity of the catalytic converter.

2. The method according to claim 1, which comprises observing the temperature measuring variable over a period encompassing at least approximately 10 hours of engine operation.

3. The method according to claim 1, which comprises observing the temperature measuring variable over a period encompassing between approximately 100 hours and approximately 1000 hours of engine operation.

4. The method according to claim 1, which comprises:
   a) observing the temperature measuring variable over a given period of time;
   b) periodically determining the temperature measuring variable at time intervals being substantially shorter than the given observation period and recording the temperature measuring variable in a memory of a multichannel analyzer belonging to the engine monitoring system;
   c) forming the mean temperature value from the contents of the memory, after the observation period has elapsed; and
   d) erasing the memory.

5. The method according to claim 1, which comprises forming the mean temperature value by integrating the temperature measuring variable over an observation period.

6. The method according to claim 1, which comprises:
a) forming further measuring variables characterizing the operating state of the engine, during operation of the engine;
b) forming further mean values by observing the further measuring variables over an observation period; and
c) determining the limit value while taking the further mean values into account.

7. The method according to claim 6, which comprises:
a) periodically recording and storing the further measuring variables in memory in a multidimensional multichannel analyzer;
b) forming the further mean value from the contents of the multidimensional multichannel analyzer, after the observation period has elapsed; and
c) erasing the multidimensional multichannel analyzer.

8. The method according to claim 7, which comprises periodically recording the temperature measuring variable jointly with the further measuring variables and storing the temperature measuring variable in memory in the multidimensional multichannel analyzer.

9. A method for monitoring catalytic activity of a catalytic converter through which exhaust gas can flow in an exhaust system of an internal combustion engine, which comprises:
measuring a temperature at least at two temperature measuring sensors of which at least one is disposed in close proximity of the catalytic converter for measuring the temperature of an exhaust gas flowing through the catalytic converter, and which at least two sensors are spaced apart in a flow direction of the exhaust gas;
periodically repeatedly determining a temperature measuring variable from signals issued by the sensors during operation of the engine with an engine monitoring system;
averaging the temperature measuring variable over a sufficiently long period of engine operation to form a mean temperature value which is substantially unaffected by short-term load conditions;
comparing the mean temperature value with a predetermined limit value; and indicating if a mean temperature value does not correspond to the limit value and ascertaining a catalytic activity of the catalytic converter.

10. The method according to claim 9, which comprises observing the temperature measuring variable over a period encompassing at least approximately 10 hours of engine operation.

11. The method according to claim 9, which comprises observing the temperature measuring variable over a period encompassing at least approximately 100 hours and approximately 1000 of engine operation.

12. The method according to claim 9, which comprises:
a) observing the temperature measuring variable over a given period of time;
b) periodically determining the temperature measuring variable at time intervals being substantially shorter than the given observation period and recording the temperature measuring variable in a memory of a multichannel analyzer belonging to the engine monitoring system;
c) forming the mean temperature value from the contents of the memory, after the observation period has elapsed; and
d) erasing the memory.

13. The method according to claim 9, which comprises forming the mean temperature value by integrating the temperature measuring variable over an observation period.

14. The method according to claim 9, which comprises:
a) forming further measuring variables characterizing the operating state of the engine, during operation of the engine;
b) forming further mean values by observing the further measuring variables over an observation period; and
c) determining the limit value while taking the further mean values into account.

15. The method according to claim 14, which comprises:
a) periodically recording and storing the further measuring variables in memory in a multidimensional multichannel analyzer;
b) forming the further mean value from the contents of the multidimensional multichannel analyzer, after the observation period has elapsed; and
c) erasing the multidimensional multichannel analyzer.

16. The method according to claim 15, which comprises periodically recording the temperature measuring variable jointly with the further measuring variables and storing the temperature measuring variable in memory in the multidimensional multichannel analyzer.

* * * * *